Aug. 4, 1959 — R. G. NYE — 2,898,587
PROPELLER NOISE SIMULATOR
Filed Oct. 11, 1954 — 5 Sheets-Sheet 1

Fig. 1a

INVENTOR.
R. GLEN NYE
BY George Sipkin
George Z. Pearson
ATTORNEYS

Aug. 4, 1959  R. G. NYE  2,898,587
PROPELLER NOISE SIMULATOR
Filed Oct. 11, 1954  5 Sheets-Sheet 4

① TRIGGERS FROM 19

②A
②B FROM 23B

③A
③B TO 27

④A
④B FROM 26B

⑤A
⑤B TO 29

⑥ TO 22

⑦ FROM 26A TO 24

*Fig. 3*

INVENTOR.
R. GLEN NYE
BY *George Sipkin*
*George E. Pearson*
ATTORNEYS

Aug. 4, 1959   R. G. NYE   2,898,587
PROPELLER NOISE SIMULATOR
Filed Oct. 11, 1954   5 Sheets-Sheet 5

Fig. 4

INVENTOR.
R. GLEN NYE
BY George Sipkin
George E. Pearson
ATTORNEYS

United States Patent Office 2,898,587
Patented Aug. 4, 1959

2,898,587

PROPELLER NOISE SIMULATOR

Robert Glen Nye, San Diego, Calif.

Application October 11, 1954, Serial No. 461,693

7 Claims. (Cl. 340—384)

(Granted under Title 35, U.S. Code (1952), sec. 266)

The invention described herein may be manufactured and used by or for the Government of the United States of America for governmental purposes without the payment of any royalties thereon or therefor.

This invention relates to propeller noise simulators and more particularly to an electronic simulator which utilizes digital methods for simulating the effect of ship's propellers as heard on supersonic sonar apparatus.

Previously used devices for propeller noise simulation utilize motor driven glass discs with light and dark areas around their periphery to represent propeller noises. Light shining through these areas activated a photo cell which in turn effected suitable circuits for creating sound. This method, however, requires heavy, expensive and fragile equipment and is also inflexible, each desired sound requiring a different disc. Another method of training sonar operators in the detection of ship propeller noises was to play records and tape recordings of actual noise picked up from listening devices. However, this method is also inflexible and does not give the instructor the desired operational control.

The propeller noise simulator of the present invention comprises a unit which is small, light, portable and has no moving parts. By digital methods, this unit can electronically simulate the effect of two, three, or four bladed propellers with accented or unaccented propeller beats, as desired. It has a wide range of controls for all types of simulation, each new type being produced merely by changing the controls. The simulator is inexpensive to build and may be used as part of any type of larger trainer or as an independent demonstrator unit.

The equipment embodying this invention is essentially an amplitude modulated noise generator in which the ionic noise generated within a gas tetrode is utilized as the noise source and the output voltage pulses of a frequency controllable free running multivibrator in conjunction with a digital countdown circuit are utilized as the modulating source. The modulated noise signal is amplified and coupled to a loudspeaker unit, earphones or other suitable audible outlet. The sea noises normally heard on sonar listening equipment are simulated by the output signals of a thyratron connected as a noise tube. The output signals are coupled to a balanced modulator circuit which provides, in addition to the modulation, a noise level control for adjusting the amount of background noise heard over the loudspeaker. Propeller noises are simulated by coupling the output voltage pulses from a free running multivibrator to a balanced modulator circuit which amplitude modulates the noise signal at the fundamental frequency of the free running multivibrator. The frequency of the multivibrator is controllable and represents the simulated propeller speed. The variations in intensity between propeller beats caused by misalignment of one or more propeller blades is simulated by providing additional voltage pulses to the modulator circuit at a sub-multiple frequency of the free running multivibrator. The frequency division is accomplished by two binary counter stages and delayed feedback from a monostable delay multivibrator. The desired frequency division can be selected as one-half, one-third, or one-fourth the fundamental frequency of the free running multivibrator. The amplitude modulated noise is coupled to a loudspeaker through an amplifier stage which includes an audio gain control for adjusting the volume of the loudspeaker output.

An object of this invention is the provision of an improved unit which will simulate ship's propeller noise.

Another object is to provide for an electronic noise simulator which is small, light, and portable and which does not have moving parts.

Another object of this invention is the provision of a propeller noise simulator employing digital techniques for simulating beat accents at sub-multiple frequencies of the simulated propeller speed frequency.

Another object of the invention is the provision of a propeller noise simulator which will produce a very wide range of types of simulated noises through instructor operated manual controls, yet is simple in design, inexpensive to manufacture, dependable in operation, and easy to service.

Other objects and many of the attendant advantages of this invention will be readily appreciated as the same becomes better understood by reference to the following detailed description when considered in connection with the accompanying drawings wherein:

Under normal tactical operating conditions, the usual sound heard when sonar listening equipment is trained in bearing toward a nearby moving vessel is a hissing noise which varies periodically in intensity at a rate determined by the speed of rotation and the number of blades of the other vessel's propeller. The increase in the noise signal recurring at regular intervals is produced by each blade of the vessel's propeller and is termed "propeller beat." Slight imperfections in the blades of a screw propeller tend to create noise energy of different intensities from each individual blade. If one blade of a four-bladed screw propeller were misaligned to a greater extent than the other blades, the noise created by the propeller and heard on sonar listening equipment might resemble a throbbing noise in which every fourth throb or pulsation was increased in intensity. The increase in intensity of the propeller beat is termed "accented beat" and can be utilized to determine the number of propeller blades and the speed of rotation of the vessel's propeller. Often, the characteristic of a ship's propeller may be so peculiar as to afford a means of identification of the vessel.

The propeller noise simulator of the present invention simulates the sounds of sea noise and propeller noise by amplitude modulating a noise signal which closely approximates the reproduced sound of underwater noises. The modulation is accomplished by positive and negative voltage pulses which are coupled with the noise signal to a balanced modulator. The PRF (pulse repetition frequency) of the negative voltage pulses can be varied and the PRF of the positive voltage pulses may be selected at one-half, one-third, or one-fourth the PRF of the negative voltage pulses. The negative voltage pulses decrease the amplitude of the noise signal producing a low level signal which simulates the background sea noise. The return of the noise signal to its normal level, i.e., absence of the modulating pulse, represents a propeller beat. The positive voltage pulse, occurring at a submultiple PRF of the negative pulses, increases the amplitude of the noise signal during an inter-pulse period between two successive negative pulses. The increase in the noise signal simulates the accented beat.

Figure 4:
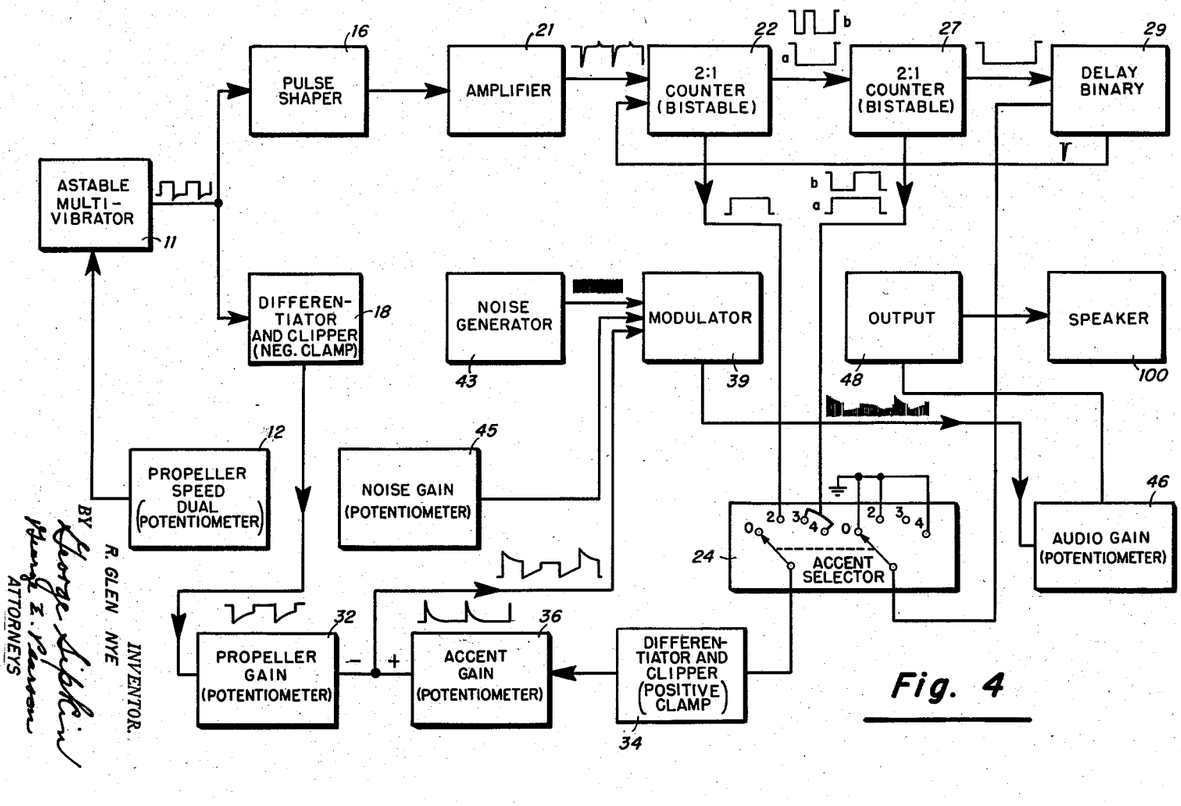
Fig. 4 is a block diagram of the simulator.

Referring now to the drawings, wherein like reference characters designate like or corresponding parts throughout the several views, it is seen in Fig. 4 that the basic unit of the equipment is an astable, or free-running, multivibrator 11 whose pulse repetition frequency is determined by a propeller speed control 12. The output of this multivibrator 11 is simultaneously fed to (1) the binary counter chain, and (2) the propeller sound channel.

Figure 1A:
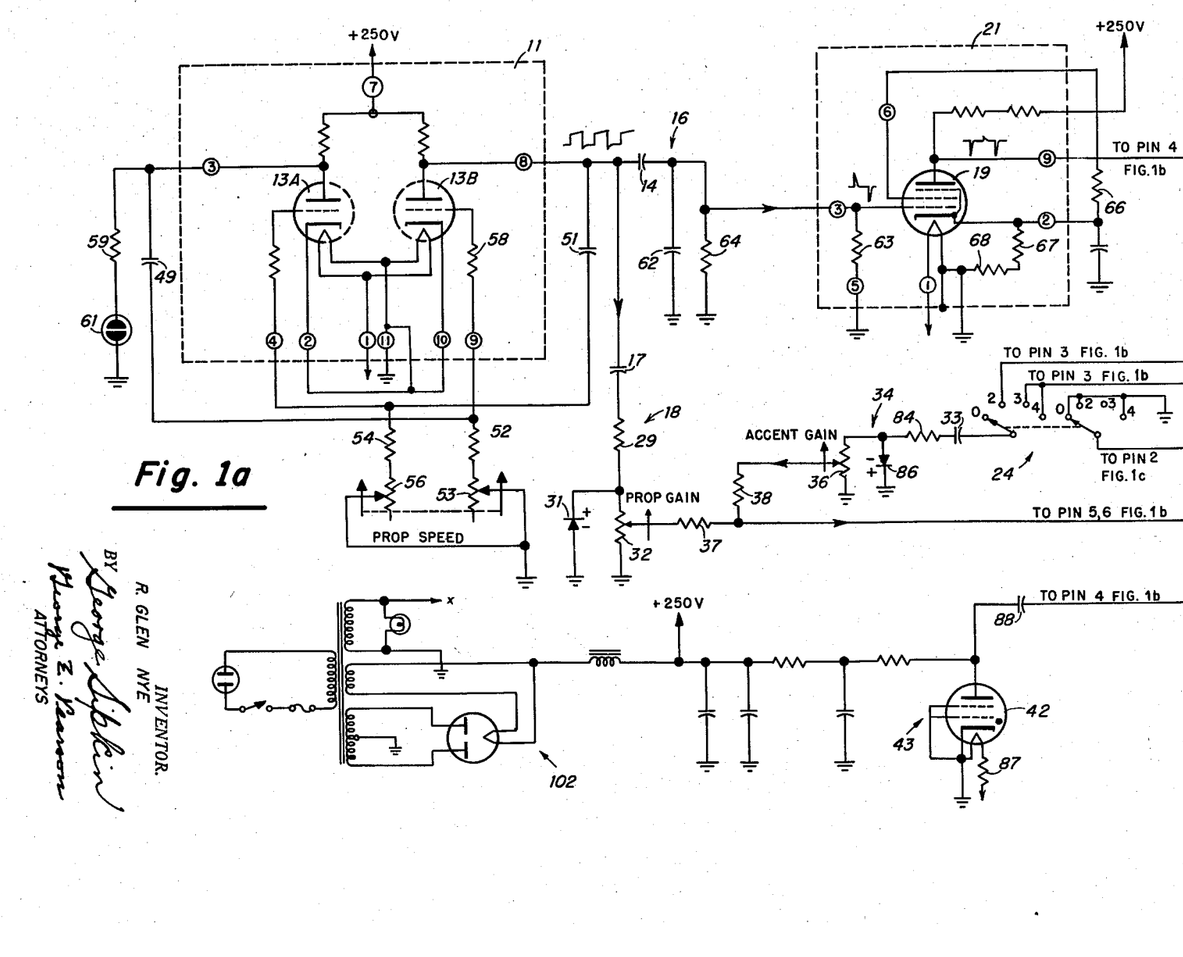
Figs. 1a, 1b, and 1c together show a schematic diagram of the propeller noise simulator.
Figure 1B:
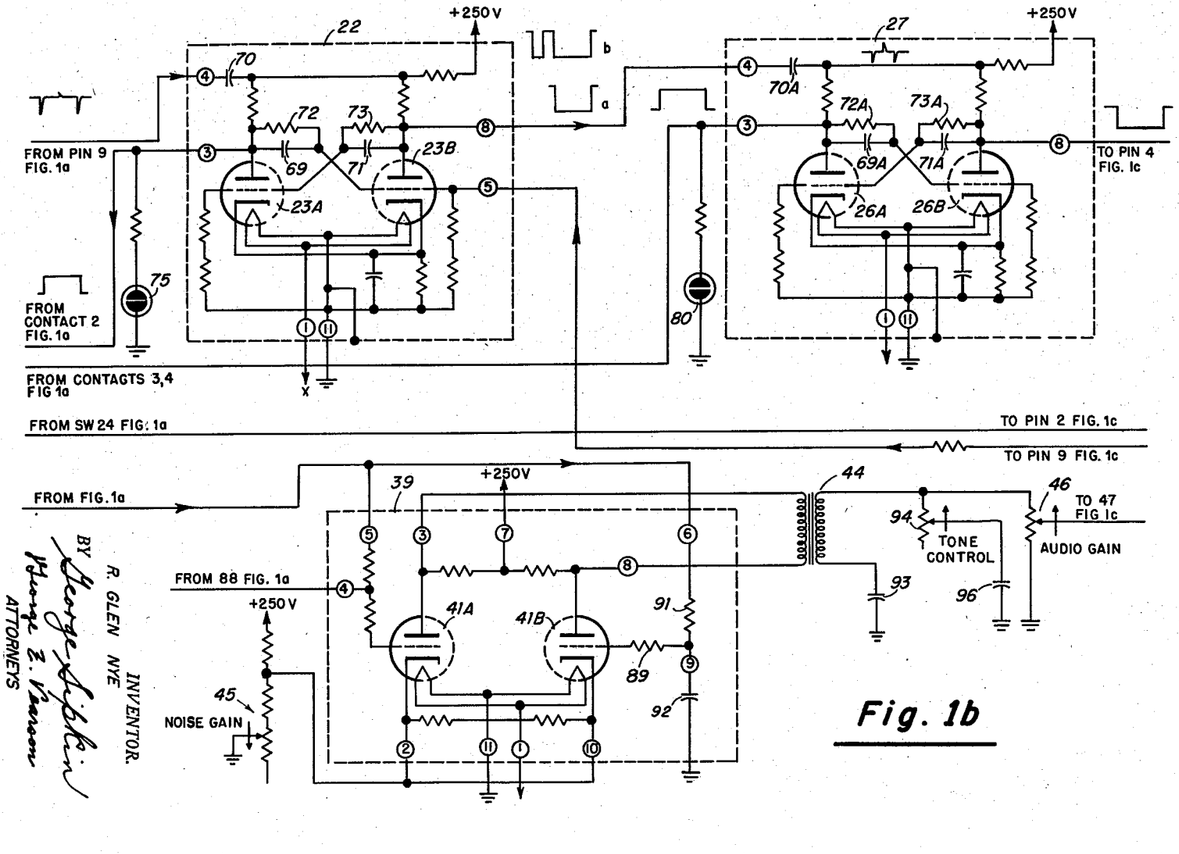
Figure 1C:
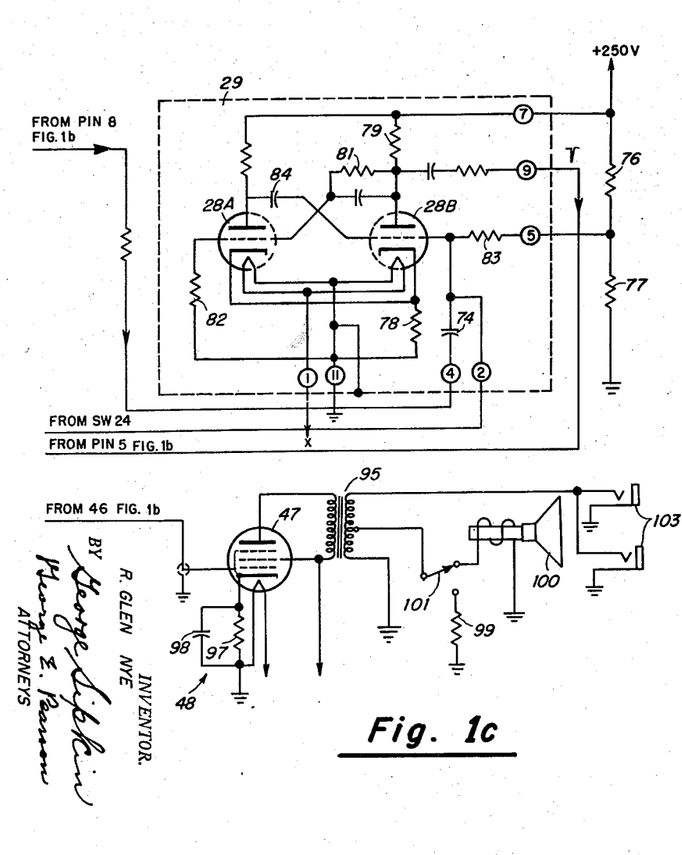

As shown in Figs. 1a, 1b, and 1c viewed together, tubes 13A and 13B in the multivibrator generates the primary voltage pulses for the propeller beat modulating signal and provides a source of triggers for the counter circuits which produce the accent modulating signal. Positive voltage pulses from the plate of tube 13B are routed to capacitor 14 in the pulse shaper circuit 16 and also to capacitor 17 in the differentiator and clipper circuit 18. The positive voltage pulses from the plate of tube 13B are differentiated and impressed on the grid of tube 19 which is connected as a biased pulse amplifier 21. The resulting output from the plate of tube 19 is a very sharp negative trigger pulse which is applied to the plate circuit of bi-stable multivibrator 22 which functions as a binary counter. The positive voltage pulses from the plate of tube 23A in counter 22 are coupled to position "2" of the Accent Selector switch 24 for use as the accent modulation pulse at one half the pulse repetition frequency of the astable multivibrator 11. The negative pulses from the plate of tube 23B are applied to the plate circuit of the second bi-stable multivibrator (26A, 26B) in the second counter 27 which is triggered by the leading edge of the negative pulse. This multivibrator is identical to the first counter 22 and provides positive voltage pulses from the plate of tube 26A which are coupled to positions "3" and "4" of the Accent Selector switch 24. Position "4" of the switch provides the accent modulation pulse at one-fourth the pulse repetition frequency of the multivibrator 11. When the switch is placed in position "3" the delay multivibrator (28A, 28B) in the delay counter circuit 29 is triggered by the leading edge of the negative pulse from the plate of tube 26B in the second counter circuit 27. The negative trigger which is delayed approximately 100 microseconds from the initiating trigger is developed at the plate of tube 28B in delay counter circuit 29. This delay trigger is coupled back to the grid of tube 23B and resets the cyclic operation of the counter circuits. The resulting positive voltage pulses developed at the plate of tube 26A occur at one-third the PRF of multivibrator 11.

Positive voltage pulses from the plate of astable multivibrator tube 13B in circuit 11 are coupled to the differentiator and clipper circuit 18 consisting of a capacitor 17, resistor 29, and crystal diode 31. This circuit produces a negative going pulse across Prop Gain potentiometer 32. The output voltage pulses from Accent Selector switch 24 are coupled to capacitors 33 in the differentiating and clipper circuit 34 which produces only positive pulses across the accent gain potentiometer 36. The negative pulses of potentiometer 32 and the positive pulses of potentiometer 36 are coupled through isolating resistors 37 and 38 to the balanced modulator 39 to the grids of tubes 41A and 41B thereof. Also connected to the grid of tube 41A in the balanced modulator 39 is a gaseous noise thyratron tube 42 which functions as a noise generator 43. The composite modulating signal consists of the negative pulses from the prop gain control 32 and the positive pulses from the accent gain control 36 which are coupled to the grid circuits of tubes 41A and 41B in the modulating circuit 39. The noise signal from the noise generator 43 is amplitude modulated by the composite modulating signal. The modulating pulses are cancelled by the balanced modulator circuit 39 so that the output signal developed by the plates of tubes 41A and 41B contains only the modulated noise signal. Noise Gain control 45 adjusts the output level of the modulated noise signal which is coupled in push-pull to inter-stage coupling transformer 44. The output voltage signal from the inner-stage coupling transformer 44 is produced across the Audio Gain potentiometer 46 which is connected to the grid of tube 47 which functions as a single stage audio amplifier in output circuit 48. Output transformer 95 couples the modulated noise signal to the loudspeaker 100 and phone jacks 103. Switch 101 disconnects the speaker when engaged with resistor 99 to maintain the phone circuit.

*Operation*

The cycle of operation for the various types of propeller beat simulation occurs as follows: If the selector 24 and the Prop Gain control 32 are both set at zero only noise passes through the system. This noise is a very close approximation of the water noises heard on sonar. The level is controlled by the Noise Gain and Audio Gain controls 45 and 46. As the prop gain control 32 is turned from zero to a maximum, this noise is modulated by the negative pips appearing across the propeller gain potentiometer 32 at the basic frequency of the astable multivibrator 11. This closely simulates the sound made by propeller blades as heard on sonar. If the selector 24 is turned to position "2" the positive pulses from the accent circuit 36 (wider than the negative pulses used to simulate propeller beats) raise the grid level of the modulator tubes 41A and 41B and allow more noise to pass through on every second beat. This causes the modulation produced by the propeller beat pips to be noticeable and reproduces the effect that, because of imperfections, one blade of a propeller will be more noticeable than the other, thus, simulating a two bladed propeller ship. Similarly, with the selector switch 24 turned to position "3" or "4," three-or-four-bladed propeller ship noises are simulated. By being able to control each data furnishing circuit over a wide range, it is possible to simulate most existing types of propeller beats. In addition, by proper manipulation of the controls, the equipment may be used to simulate sounds made by depth charges.

*Detailed circuit analysis*

To facilitate speed and convenience in repair and maintenance multivibrator 11, amplifier 21, counters 22, 27, and 29 and modulator 39 have been built as packaged plug-in units which may be replaced as a single unit.

*Astable multivibrator 11.*—The dual cathode follower plug-in unit idicated as 11 in Figs. 1a and 4 which may be considered as a two-stage wide-band amplifier in which the output from the second stage is capacitively coupled back to the input of the first stage. Although the two stages are closely balanced, inherent differences in the tube characteristics and tolerances between the values of the components prevent the two stages from being identical. When the multivibrator is initially energized, the slight difference in balance causes each stage to approach a quiescent condition at different instants of time. Since the output of each stage is capacitively coupled to the input of the adjacent stage, neither stage reaches quiescence but is driven between cutoff and conduction. This action can be explained by assuming, for simplicity, that the filament of each tube has previously been energized and the plate supply voltage is suddenly applied. The plate voltage of each tube is equal to the supply voltage at the instant of application but rapidly falls as plate currents flow. The drop in plate voltage of tube 13A is impressed on the grid of tube 13B through coupling capacitor 49 and the drop in plate voltage of tube 13B is impressed on the grid of tube 13A through coupling capacitor 51. Since the voltages are not exactly equal, one of the tubes will receive a larger negative grid voltage which tends to decrease the plate current causing a greater difference between the plate voltages of each tube. The intercoupling of plate voltages to the grids of adjacent stages produces a cumulative action which drives one tube to cutoff.

If tube 13A is considered as the tube driven to cutoff, the cessation of plate current causes the plate voltage of tube 13A to rise to the supply voltage causing a charging current to flow through capacitor 49 and grid resistors 52 and 53. The flow of current through the grid resistors develops a positive bias voltage on the grid of tube 13B and thus maintains conduction. The drop in plate voltage of tube 13B causes a discharging current to flow through capacitor 51 and grid resistors 54 and 56, producing a negative bias voltage on the grid of tube 13A maintaining the plate current cutoff.

The currents through capacitors 51 and 49 decrease exponentially and the biasing voltages become smaller until the reduced bias voltage allows plate current to flow through tube 13A. The resulting drop in plate voltage of tube 13A is coupled to the grid of tube 13B driving the grid bias voltage of the latter tube in a negative direction. The cumulative action causes tube 13B to be driven to cutoff where it remains for a time interval determined by the rate of rise of the negative grid voltage. Hence, for a symmetrical circuit the frequency of oscillation varies approximately inversely as the time constant of the coupling capacitor and grid resistors. The exact frequency of oscillation is determined by the time interval required for the negative grid bias voltage to rise to the value where plate current starts to flow.

Resistors 56 and 53 comprise the multivibrator frequency control designated as Prop Speed. Resistors 57 and 58 limit grid current during positive grid bias. Resistor 59 limits the flow of current through indicator light 61. Indicator light 61 glows when tube 13A is cutoff and provides a visual check of the operation of the multivibrator 11.

*Pulse shaper 16 and amplifier 21.*—The rectangular voltage pulses developed at the plate of multivibrator tube 13B are coupled to capacity-divider circuit condensors 14 and 62 which reduces the amplitude of the pulses applied to biased pulse amplifier stage 21. The differentiating action of resistors 63 and 64 in parallel with capacitor 62 produces a positive pulse of short duration from the leading edge of the rectangular pulse and a negative pulse of short duration from the trailing edge. The differentiated pulses are applied to the grid of amplifier tube 19. The cathode of tube 19 is raised to a positive potential by voltage-divider circuit 66, 67, and 68, so that the tube operates near cutoff and peak clips the applied negative pulses. The differentiated positive pulses are amplified and appear at the plate of tube 19 as very sharp negative triggers which occur in synchronism with the leading edge of the output voltage pulses from the astable multivibrator. The negative triggers are routed to the first counter circuit 22.

*Counter circuits.*—Digital counter circuits initiated by triggers from the pulse shaper circuit provide pulses to the modulator 39 at a frequency which can be selected by "Accent Selector" switch 24. The frequency division obtainable is one-half, one-third, or one-fourth the frequency of the astable multivibrator 11 which is accomplished by two bistable multivibrators 22 and 27 and a delay multivibrator 29.

*Bistable multivibrators 22, 27 (Fig 16).*—The negative triggers from the plate of biased pulse amplifier tube 19 are capacitively coupled at 70 to the plate circuit of the first counter stage 22. This circuit is a scale-of-two counter, i.e., it produces one output pulse for every two trigger pulses. The functioning of this circuit is similar to the multivibrator 11 except that D.-C. coupling between the plate and grid circuits prevents the grid bias voltage from changing after the transition period; consequently, the circuit of the bistable multivibrator has two stable states. The transfer of stable states is accomplished by the application of a trigger to the plate circuit. The negative trigger has no effect upon the tube cutoff but decreases the current through the conducting tube resulting in a rise in plate voltage which is coupled to the grid of the tube cutoff. The action is cumulative and a change in stable states rapidly occurs.

The function of capacitors 69 and 71 in parallel with plate-to-grid coupling resistors 72 and 73 is to eliminate the effects of interelectrode capacitances which tend to prevent triggering. Grid-plate capacitance couples trigger pulses applied to the grid to the plate of the same tube which tends to cancel the action of the applied pulse. Since the voltage across a capacitor in series with a resistor such as 72 or 73 cannot change instantaneously, grid-cathode capacitance tends to prevent the grid voltage from changing. The function of capacitors 69 and 71 is to provide an instantaneous change in grid voltage of either tube when the plate voltage of the other tube changes.

The plate voltage of tube 23A provides a positive voltage pulse for every two negative triggers applied to the plate circuit. This pulse is coupled to position "2" of "Accent Selector" switch 24. The negative voltage pulses from the plate of tube 23B are differentiated and applied to the second scale-of-two counter circuit 27. The operation of this circuit is identical to the operation of the bistable multivibrator presented above, except that the pulses from the plate of tube 26B is coupled at 74 to the grid of 28B of delay counter 29. Glow lamps 75 and 80 provide visual checking of the performance of the two counters. The positive output voltage pulse from the plate of tube 26A is coupled to positions "3" and "4" of "Accent Selector" switch 24. When counter circuits 22 and 27 are operated in cascade, the output voltage pulse occurs at one-fourth the PRF of the astable multivibrator 11. A negative voltage pulse coupled from the plate of tube 26B to the delay multivibrator 29 initiates the delay feedback trigger which recycles counter circuits 22 and 23 for scale-of-three operation.

*Delay multivibrator 29 (Fig. 1c).*—The delay multivibrator 29 indicated is a monostable multivibrator which has one stable state and one quasi-stable state. The circuit normally resides in a stable state with tube 28B conducting. The bias voltage of tube 28B is determined by the voltage-divider action of resistors 76 and 77 and by flow of plate current through common cathode resistor 78. The plate voltage of tube 28B rests below the supply voltage by an amount equal to the IR drop across resistor 79. The plate voltage of tube 28B is applied across voltage-divider circuit 81 and 82 which produces a positive voltage with respect to ground on the grid of tube 28A. However, the flow of plate current from tube 28B through common cathode resistor 78 raises the cathode potential of tube 28A above ground so that the grid voltage is negative with respect to the cathode producing a bias voltage which maintains tube 28A at cutoff. Under these conditions, tube 28A has zero transconductance and the state of the circuit is completely stable.

The application of a negative trigger from tube 26B on the grid of tube 28B causes the plate current to decrease resulting in a rise in the plate voltage which is impressed upon the grid of tube 28A. Since the flow of plate current from tube 28B through cathode resistor 78 decreases during the application of the trigger, the cathode voltage of tube 28A drops. The combined action of the rise in plate voltage of tube 28B transferred to the grid of tube 28A and the drop in cathode voltage results in a bias voltage on tube 28A which enables plate current to flow. The resulting drop in plate voltage of tube 28A is coupled to the grid of tube 28B through coupling capacitor 84. The action is regenerative and tube 28B is driven to cutoff placing the circuit in a quasi-stable state. Capacitor 84 discharges exponentially until the grid voltage of tube 28B rises to a potential which enables plate current to flow. The circuit therefore is again regenerative and transfers to its original stable state. Thus, the application of the negative trigger to the grid of tube 23B produces a negative pulse from the plate of this tube after a time interval determined by the discharge of capacitor 84. The length of time spent by the circuit in its quasi-stable state is called the delay time. The negative output trigger is coupled to tube 23B and recycles the counter circuits to provide an output pulse from the second counter circuit 27 which occurs at one-third the repetition frequency of the pulses from the astable multivibrator 11. The grid of tube 28B is clamped to ground potential by all positions of "Accent Selector" switch 24 except position "3." The delay multivibrator is thus disabled except for scale-of-three operation.

Figure 3:
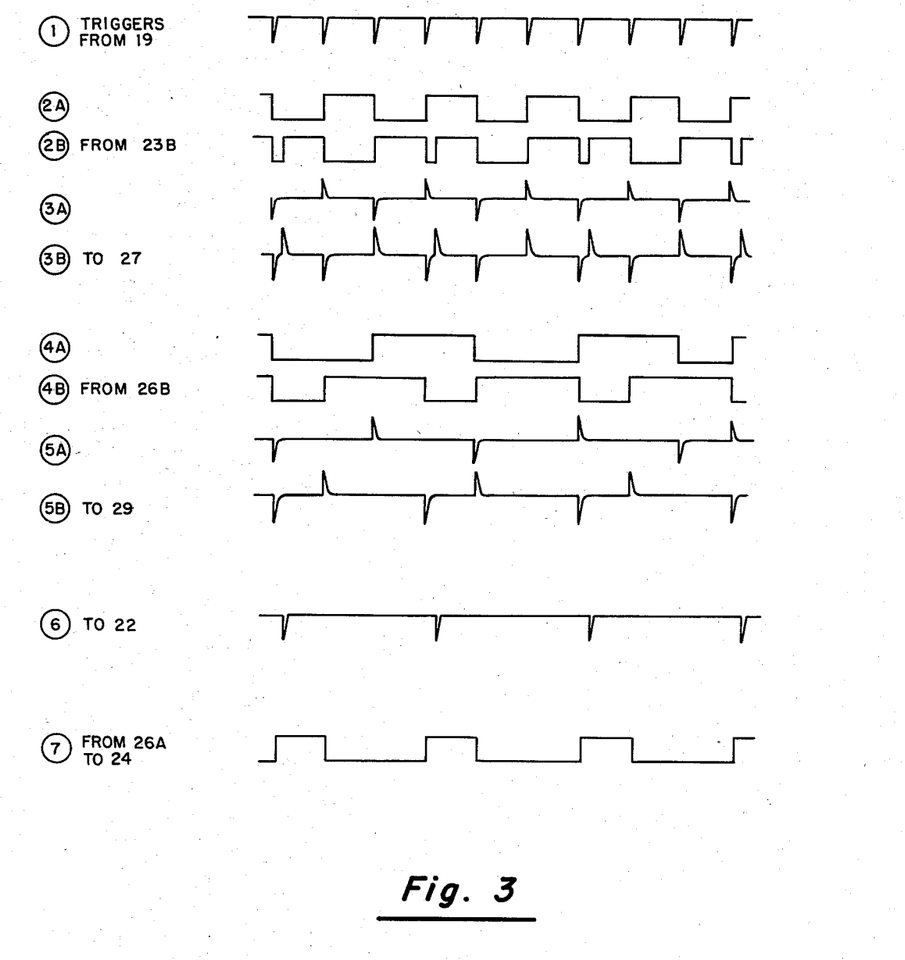
Fig. 3 shows a scale-of-three timing chart.

*Scale-of-three operation (Fig. 1 and Fig. 3).*—An accent pulse with a repetition frequency equal to one-third the frequency of the astable multivibrator 11 is derived by counter circuits 22 and 27 in conjunction with delay multivibrator 29. The timing waveforms for scale-of-three operation are given in Fig. 3. The initial trigger from the pulse shaper amplifier tube 19 (line 1) applied to counter circuit 22 produces a negative voltage pulse (line 2a) from the plate of tube 23B. Differentiation of this negative pulse produces a negative trigger (line 3a) which is applied to the plate circuit of counter stage 27. This trigger produces a voltage pulse of negative polarity (line 4a) at the plate of tube 26B which is differentiated (line 5a) and applied to delay multivibrator 29. If "Accent Selector" switch 24 is in position "3," the delay multivibrator is triggered and after a time interval equal to the delay time of the delay multivibrator 29 a negative trigger (line 6) is coupled back to the first counter stage 22. The delay time is sufficient to enable counter stage 22 to change stable states prior to the application of the delayed feedback trigger. Shortly after 22 has been triggered by the initial negative trigger from the pulse shaper circuit 16, the delayed feedback pulse (line 6) retriggers 22 back to its original state (line 2b). Differentiation of the resulting positive pulse produces a positive trigger (line 3b) which is coupled to the second counter stage 27 but has no effect upon the circuit operation. The next trigger from the pulse shaper (line 1) develops a negative voltage pulse (line 2b) from the plate of tube 23B which is differentiated (line 3b) and coupled to 27 (line 4b). This differentiated pulse triggers counter stage 27 producing a positive pulse which is differentiated (line 5b) and coupled to the delay multivibrator 29 but has no effect upon the circuit. The second pulse after the initial pulse from the pulse shaper 16, indicated as trigger No. 2 in line 1, develops a positive pulse (line 2b) from tube 23B which when differentiated (line 3b) has no effect upon counter stage 27. The next pulse 3 from the pulse shaper triggers 22 which once again applies a negative trigger to 27 (line 3b) initiating a change of state. The differentiated negative voltage pulse (line 5b) from 27 triggers delay multivibrator 29 and the cycle repeats. The voltage pulses developed at the plate of tube 27A (line 7) are of opposite polarity to the pulses produced at the plate of tube 27A (line 4b) and are coupled to position "3" of "Accent Selector" switch 24.

*Mixing circuits 18, 34 (Fig. 1a).*—Positive output voltage pulses from the astable multivibrator 11 and the counter circuits are clamped at different levels and mixed to form a composite modulating signal which is applied simultaneously to both grids of the balanced modulator tubes 41A and 41B. The positive voltage pulses from the astable multivibrator 11 are impressed across the series-parallel combination of capacitor 17, resistors 29 and 32, and crystal diode 31. Since the voltage across the capacitor cannot change instantaneously, the voltage at the junction of capacitor 17 and resistor 29 rises to the initial peak voltage of the positive pulse. Crystal diode 31 operates as a low impedance to the positive voltage applied across resistor 29 and the diode causing a charging current to flow through the capacitor 17. Capacitor 17 charges exponentially with a time constant determined by resistor 29, capacitor 17, and the impedance of diode 31 which is essentially negligible. The voltage at the junction of capacitor 17 and resistor 29 decreases during the charging period; however, the voltage across diode 31 and "Prop Gain" potentiometer 32 remains nearly zero by virtue of the low impedance to ground offered by the diode. When the applied positive voltage pulse drops, the charge on capacitor 17 immediately reverses and the voltage at the junction of capacitor 17 and resistor 29 becomes negative. Crystal diode 31 acts as an infinite impedance to the negative voltage applied across resistor 29 and diode 31 in parallel with "Prop Gain" potentiometer 32, so that a portion of the resulting negative voltage pulse is developed across "Prop Gain" potentiometer 32. The leading edge of the negative pulse corresponds with the trailing edge of the applied positive pulse and the duration of this pulse is determined by the exponential discharge current of capacitor 17 which is governed by resistor 29 and "Prop Gain" potentiometer 32.

The positive voltage output pulses from the counter circuits are impressed across the series-parallel combination of capacitor 33, resistor 84, and crystal diode 86 in parallel with "Accent Gain" potentiometer 36. The circuit operates in the same manner as the "Prop Gain" negative clamp except that crystal diode 86 is reversed from 31 so that the circuit functions as a positive clamp providing only pulses of positive polarity across "Accent Gain" potentiometer 36. The positive and negative voltage pulses from the "Accent Gain" potentiometer 36 and "Prop Gain" potentiometer 32 are combined through isolating resistors 37 and 38. Resistor 38 acts as a high impedance to the negative pulse from the "Prop Gain" potentiometer 32 preventing loss of the pulse through diode 86. Resistor 37 provides a high impedance path to the positive pulses from the "Accent Gain" potentiometer 36.

Figure 2:
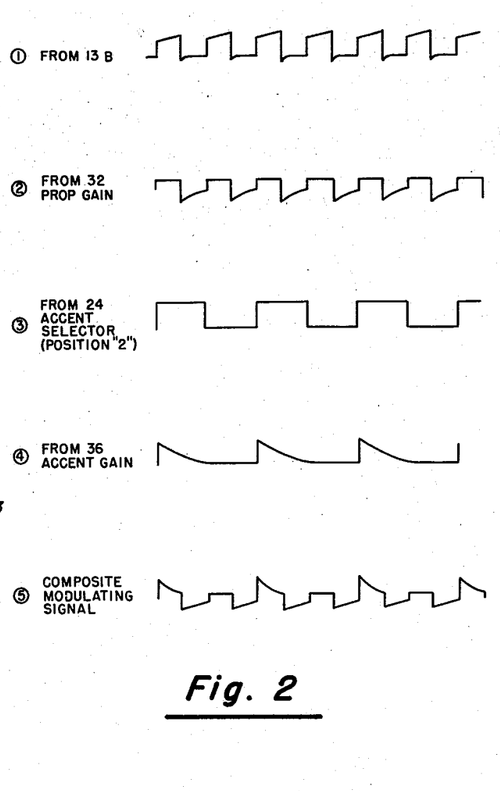
Fig. 2 shows a composite modulating signal timing chart.

The sequence of the positive and negative modulating pulses is illustrated in Fig. 2. Since the negative modulating pulse (line 2) is derived from the trailing edge of the multivibrator pulse (line 1) and the positive modulating pulse (line 4) is derived from the leading edge of the pulse from the counter circuits (line 3), the composite modulating signal (line 5) contains positive pulses which occur during an interpulse period between successive negative pulses. The composite modulating signal shown in line 5 of Fig. 2 represents a low speed propeller with an accent on alternate propeller beats. The decay in the pulse amplitudes are caused by exponential charging currents in the clamping circuits.

*Noise generator 43 (Fig. 1a).*—A gas tetrode tube 42, connected as a noise tube, serves as a noise generator 43. Although the noise generated within an electron tube may be attributed to many factors, the principal causes of noise in the circuit of tube 42 are the random variations in the rate of production of electrons and ions within the tube caused by bombardment and collision of gas molecules and the random rate of emission of electrons from the cathode. The generation of positive ions tends to reduce cathode space charge so that the plate absorbs nearly all the electrons emitted from the cathode. This effect is increased by resistor 87 which lowers the filament voltage of tube 42 decreasing the rate of electron emission from the cathode. Under this condition, the electrons emitted from the cathode vary in a random way and bombard the neutral gas molecules producing additional electrons and positive ions. The resulting fluctuation in the electron stream flowing to the plate of tube 42 produces noise which is distributed evenly over the frequency spectrum. This noise signal is coupled through capacitor 88 to the grid of modulator tube 41A.

*Balanced modulator 39 (Fig. 1b).*—The modulator circuit, indicated as 39 in Fig. 4, functions in a manner similar to a difference amplifier. The composite modulating signal is applied simultaneously to the grids of tubes 41A and 41B so that the plate voltage of each tube varies identically. Since the primary winding of transformer 44 is connected between the plate of each tube, the modulating pulses are balanced out. The noise signal, however, is coupled to the grid of tube 41A and is isolated from the grid of tube 41B by resistors 89 and 91 and bypass capacitor 92. The modulating pulses applied to the grid of tube 41A vary the grid bias voltage in the non-linear operating region of the tube's characteristics; consequently, the amplitude of the noise signal at the plate of tube 41A varies as the amplitude of the modulating pulses. The modulating pulses are balanced out across the primary winding of transformer 44 leaving only the modulated noise signal.

The actual simulation of the propeller beat does not occur in time synchronism with the negative modulating pulse but is represented by the normal noise level during the inter-pulse period between successive negative pulses. The negative going pulses provide the contrast necessary for the simulation of the propeller beat. The normal noise signal level, i.e., absence of modulating signal, is adjusted by "Noise Gain" control 45 which varies the cathode potential of both tube 41A and tube 41B changing the bias voltage.

*Output stage 48 (Fig. 1c).*—The modulated noise signal from the balanced modulator 39 is coupled through transformer 44 to "Audio Gain" potentiometer 46. Capacitor 93 in combination with the resistance of potentiometer 46 provides attenuation for the low frequency components in the modulated signal. "Tone Control" resistor 94 and capacitor 96 comprise a low-pass filter for adjusting the amplitude of the high-frequency components. The output from "Audio Gain" potentiometer 46 is applied directly to the grid of amplifier tube 47 which is self-biased by resistor 97 and capacitor 98. Output coupling transformer 95, connected in the plate circuit of tube 47, couples the modulated signal to the voice coil of loudspeaker 100. An additional secondary winding on transformer 95 is coupled to phone jacks 103 providing an output with a nominal impedance of 600 ohms. Resistor 99 acts as a dummy load when the loudspeaker is disconnected by "Speaker" switch 101.

*Power supply 102 (Fig. 1a).*—The power supply designated generally by 102 is of conventional design and detailed description thereof is not deemed necessary. It supplies all filament and plate power required by the unit. Since the circuitry used in the simulator is quite insensitive to minor variations in the input voltage there is no appreciable change in operation when the supply voltage is varied between 100 volts and 130 volts. The power supply operates from a single-phase, 105/130 volt A.C. power source of 57 to 63 cycles.

As one modification to the preferred embodiment above described, the output from delay counter 29 could be connected to position "3" on selector switch 24, instead of to the grid of tube 23B in counter 22. In such case, the arm of switch 24 would be connected to the grid of tube 23B and the ground connections removed from positions "0," "2" and "4" of selector switch 24. Thus, when the switch is in position "3," the delay trigger is coupled through the switch and back to the grid of tube 23B in counter 22 and resets the cyclic operation of the counter circuits in the same manner as before.

Obviously many modifications and variations of the present invention are possible in the light of the above teachings. It is therefore to be understood that within the scope of the appended claims the invention may be practiced otherwise than as specifically described.

What is claimed is:

1. An electronic device for producing audio frequencies simulating the audio frequencies of noise produced by ship propellers comprising, in combination, means for generating a signal at a selected frequency, means for varying said frequency as desired, means for accenting said signal at a selected submultiple of said signal frequency, means for varying the submultiple of said signal frequency to ½, ⅓, or ¼ of said selected frequency as desired, means for generating a noise signal, means for adjusting the volume level of each of said signals, means for modulating said signals, and audible presentation means operable by the resulting modulated signals thereby simulating the sound of 2, 3, and 4 bladed ship propellers revolving at various speeds and at varying distances from a listening device.

2. An electronic device for producing audio frequencies simulating the audio frequencies of noise produced by ship propellers comprising, in combination, means for generating a first signal at a selected frequency, means for generating a second signal, means for modulating said signals, audible presentation means operable by the resulting modulated signal, and means for accentuating said first signal at a selected submultiple of said selected frequency comprising means accentuating every second cycle of said frequency, means accentuating every third cycle of said frequency, means accentuating every fourth cycle of said frequency, and switch means for selectively connecting said accentuating means to said modulating means.

3. The structure of claim 2 and including means for varying the selected frequency to simulate varying propeller speeds, means for varying the volume of second signal with respect to said first signal to simulate variations in proximity of ship's propellers from listening devices, and means varying the intensity of the accentuation of said accentuating means to simulate varying degrees of mis-alignment of propeller blades to facilitate the simulation of all types of propeller noises heard on underwater listening devices.

4. An electronic device for producing audio frequencies simulating the audio frequencies of the noise produced by ship propellers comprising, in combination, a free-running multivibrator operable to produce square waves at a predetermined frequency, a binary counter chain and a propeller sound channel connected thereto in parallel, said propeller sound channel transforming energy from said multivibrator into negative pulses of predetermined amplitude, said counter chain transforming energy from said multivibrator into a positive pulse output at a selected submultiple of predetermined multivibrator frequency, a modulator circuit, a noise generator connected to said modulator circuit, said chain and said channel connected to said modulator circuit where signals therefrom are mixed with noises from said noise generator, and an audio output stage connected to said modulator circuit for producing audio noise signals simulating propeller noises as heard on underwater listening devices.

5. An electronic device for producing audio frequencies simulating the audio frequencies of the noise produced by ship propellers comprising, in combination, a free-running multivibrator operable to produce square waves at a predetermined frequency, a binary counter chain connected thereto and operable to convert said square waves into positive pulses at selected submultiples of said predetermined frequency, a simulated propeller sound channel connected to said multivibrator and operable to convert square waves therefrom into negative pulses at said predetermined frequency, a modulator circuit, a noise generator connected to said modulator circuit, said chain and said channel connected to said modulator circuit where signals therefrom are mixed with noises from said noise generator, and an audio output stage connected to said modulator circuit for producing audio noise signals simulating propeller noises.

6. Apparatus for electronically simulating a two, three or four multi-bladed propeller noise including selected simulated accented blade beats, comprising means for generating a first signal corresponding to a predetermined propeller frequency, means for generating a second signal having a frequency simulating a selected accented blade beat comprising a multi-contact selector switch connected to two bistable multivibrators and a delay multivibrator, means for generating a simulated propeller noise signal, means for varying the intensity of said signals independently, and a modulator circuit connected to a loudspeaker for presenting a modulated signal, thereby simulating the sound of a two, three, or four bladed ship propeller revolving at various speeds and at varying distances from a listening device.

7. An apparatus for electronically simulating a two, three or four multi-bladed propeller noise including simulated selected accented blade beats, comprising a free running multivibrator, a simulated propeller speed control for adjusting the repetition frequency of said multivibrator, a modulator connected to said multivibrator through parallel circuits including a simulated propeller sound circuit and a simulated accented blade beat circuit, said blade beat circuit comprising a multi-contact selector switch connected to two bistable multivibrators and a delay multivibrator for simulating a selected accented blade beat, and audible means connected to said modulator for simulating the sound of a two, three, or four bladed ship propeller revolving at various speeds and at varying distances from a listening device.

References Cited in the file of this patent
UNITED STATES PATENTS

| | | |
|---|---|---|
| 1,994,902 | Trouant | Mar. 19, 1935 |
| 2,354,699 | Owens | Aug. 1, 1944 |
| 2,386,992 | Trott | Oct. 16, 1945 |
| 2,445,712 | Forbes | July 20, 1948 |
| 2,455,472 | Curl et al. | Dec. 7, 1948 |
| 2,483,226 | Newman | Sept. 27, 1949 |
| 2,490,487 | Stevens | Dec. 6, 1949 |
| 2,548,684 | Roth | Apr. 10, 1951 |